May 10, 1932. C. F. DENCKLAU 1,857,363
AUTOMATIC FAUCET
Filed Aug. 8, 1928
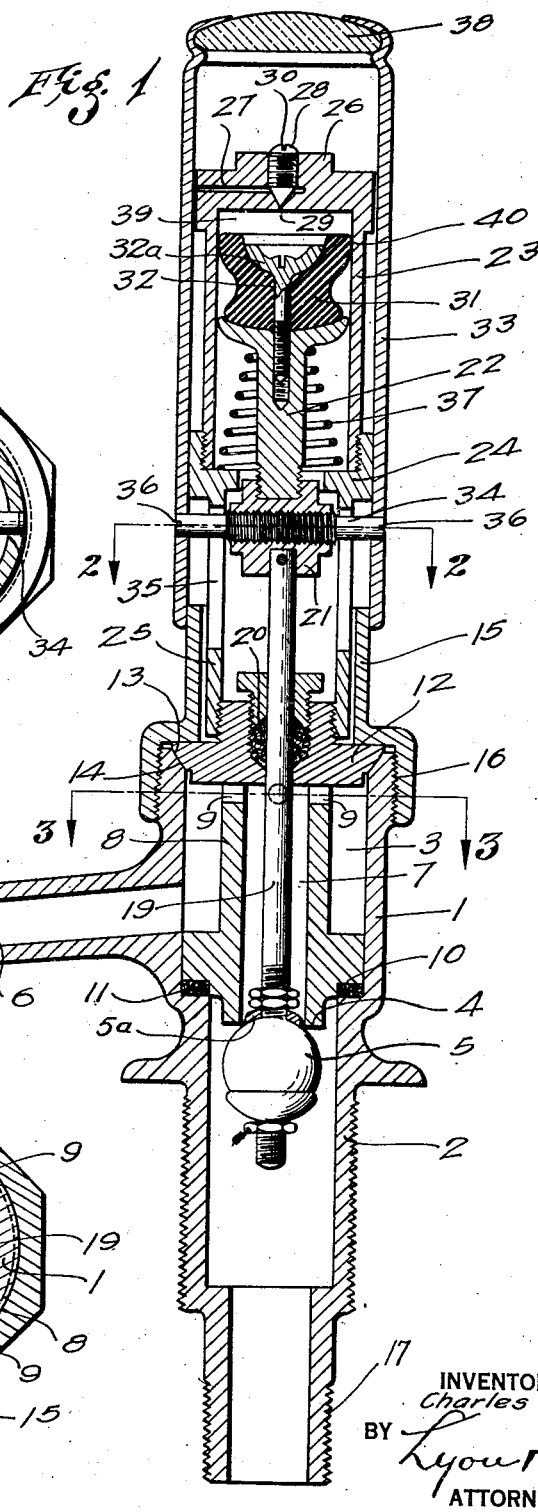
INVENTOR
Charles F. Dencklau
BY Lyon & Lyon
ATTORNEYS Patented May 10, 1932

1,857,363

UNITED STATES PATENT OFFICE

CHARLES F. DENCKLAU, OF LOS ANGELES, CALIFORNIA

AUTOMATIC FAUCET

Application filed August 8, 1928. Serial No. 298,361.

This invention relates to a time performing regulated automatically closing faucet. Faucets of this type close automatically after remaining open for a specific time. Faucets of this type are employed largely in office buildings and the like, to prevent waste of water. In a common type of such faucets the valve is closed by means of a spring when the handle or lever of the valve is released. The working parts which control the automatic closing of the valve are in contact with the water and subjected to its deteriorating effects, and also to the deposit of sediment carried in the water.

Another type of faucet functioning in this manner has been in use, in which hydraulically controlled means is employed to effect a retarded closing of the valve. Such hydraulic means may operate in conjunction with a closing spring for the valve.

Neither of these types of self-closing valve is entirely satisfactory. The type which is closed by spring action without being retarded does not permit of any timing or regulation of the flow of water. The hydraulically controlled type by permitting regulation, is objectionable for the reason that it usually functions by means of by-passes that tend to become stopped up by sediment in the water, frequently rendering the faucet entirely inoperative. The faucets of the type referred to above which have been in use are constructed in such a way that when they are opened the water flows out with full pressure and unchecked, and tends to produce a splashing effect in the wash basin below the faucet.

The general object of this invention is to produce a faucet having features of construction which will overcome these effects, and to provide a faucet which is particularly adapted to meet modern hygienic and water conserving needs; also to provide a faucet which is especially suited for use in public buildings, office buildings, hotels, apartments, hospitals, factories, and the like.

A further object of the invention is to provide a faucet of this type which, if desired, can be readily combined with hot and cold water supplies and is constructed so as to provide a chamber which will operate as a mixing chamber for the hot and cold water when used together, and which will operate in any event to prevent violent escape of the water from the faucet with incidental splashing.

A further object of the invention is to provide a faucet of this type in which the timed retarding means for retarding the closing of the valve will not be water-operated, nor in contact with the water; also to provide a faucet of this type with pneumatic means for controlling the retarded closing of the valve.

A further object of the invention is to provide a valve of this type which in closing will not gradually diminish the current of water flowing from the spout of the faucet, but which will provide means for supplying a substantially uniform flow of the water as long as the water flows.

Further objects of the invention will appear hereinafter.

The invention consists in the novel parts and combination of parts to be described hereinafter, all of which contribute to produce an efficient automatic faucet.

A preferred embodiment of the invention is described in the following specification, while the broad scope of the invention is pointed out in the appended claims.

In the drawings:

Figure 1 is a vertical section through a valve embodying my invention.

Figure 2 is a cross-section through the valve on the line 2—2 of Figure 1.

Figure 3 is a horizontal cross-section on the line 3—3 of Figure 1.

In practicing the invention I provide a water valve and to it I connect a member which may be operated by one's hand or arm to open the valve. This member is connected with pneumatic means that co-operates with the valve to effect its retarded closing. In order to accomplish this I provide a valve body 1 of tubular form, the lower end of which is provided with a threaded nipple 2 to facilitate securing the valve body to a wash-stand or the like. The interior of this body carries a water chamber 3 which is located above the valve seat 4 upon which a valve closure 5 seats when the valve is closed.

This water chamber operates to receive and accumulate water flowing through the valve closure 5 toward the spout 6 of the faucet. The valve seat 4 is formed at the lower end of a bore 7 formed in a tubular seat bushing or baffle 8, that fits within the water chamber 3. The upper end of this bushing is provided with openings 9 through its wall.

The upper side of the valve closure or ball 5 is provided with a cap 5ª of concavo-convex form.

The lower end of the nipple is provided with a threaded extension 17 to be connected to a water-supply pipe.

In order to provide a water-tight seal for the bushing 8, I provide the same with an annular shoulder 10 which seats upon a soft gasket or packing ring 11.

The upper end of the body 1 is closed by a cover 12 which is preferably formed with a curved face 13 that seats upon a similar face 14, and these surfaces are ground together so that they form a ground joint.

The cover 12 is held in place by a tubular guide 15 which is of enlarged diameter at its lower end and connected by screw threads 16 to the upper end of the valve body.

The valve closure is provided with a stem 19 that extends upwardly through the bushing 8 and through a stuffing box 20 in the cover 12. Above the stuffing box this stem is attached to a coupling 21 that connects it to a pneumatic plunger or piston 22 mounted for movement in a pneumatic cylinder 23. The lower end of this cylinder screws into a head 24 formed on the upper end of a tubular connection 25 which may be screwed onto the upper side of the cover 12.

The cylinder 23 may be provided with an integral head 26 having a bleeder port 27 with an adjustable needle-valve 28 for controlling flow of air through the port and through a small orifice 29 adjacent the conical tip of the valve. The upper end of the needle-valve may have a screw-driver slot 30 for adjusting the same.

The upper end or head of the piston 22 is slightly cupped and receives a soft packing head 31 of graphited material, or other expansible material, held in place by an adjusting screw 32 that passes down into the plunger. This adjusting screw has a large rounded head 32—a that is convex on its under side and fits into a corresponding rounded socket on the upper side of the packing head 31. By tightening up on this screw the mushroom packing 31 can be further extended to increase its tightness in the bore of the pneumatic cylinder 23.

Mounted to slide over the pneumatic cylinder 23 I provide a tubular shell 33 the lower end of which carries a cross-pin 34 that passes through the coupling 21 and also passes through diametrically opposite slots 35 in the wall of the connection piece 25. This pin 34 may have its middle portion threaded into the coupling 21 and is formed at one or both ends with screw-driver slots 36 to facilitate its removal.

A coil spring 37 may be provided under the head of the piston 22 which assists in restoring the piston to its elevated position after the valve has been opened.

The lower end of the tubular shell 33 telescopes over the tubular guide 15 that extends up from the upper end of the body 1.

The upper end of the tubular shell 33 may be closed by a piece of china 38, marked "Press", or marked "Hot" or "Cold" in case the faucet is used for either hot or cold water.

In the operation of the valve, by pressing down on the upper end of the sleeve or shell 33, the valve-stem 19 will be forced downwardly so as to unseat the valve closure 5. This downward movement of the stem 19 also imparts downward movement to the pneumatic piston 22. When the packing head 31 moves downwardly, a partial vacuum is formed in the upper end 39 of the pneumatic cylinder into which air passes through the lower end of the cylinder, moving past the edge 40 of the packing, which will not operate as a tight packing in this direction of movement of the piston. As soon as the sleeve or shell 33 is released, the spring 37 exerts its force to return the valve closure 5 to its closed position. The closing of the valve, however, will be retarded by the air in the chamber 39 which will escape slowly through the bleeder port 27. It will be noted that the bleeder port 27 opens out on the side face of the head 26 of the cylinder. This, however, will not prevent influx and efflux of air through this port because this head 26 fits loosely in the sleeve 33.

As the air in the chamber 39 gradually escapes the closure 5 will move upwardly and will eventually come upon the seat 4 and close off the flow of water to the valve.

The water in its flow through the open valve passes up the bore 7 and through the ports 9 into the water chamber 3. The flowing water fills this chamber 3 so that after the valve closure 5 is seated, the water will continue to flow from the chamber 3 for a short time. This tends to give a substantially uniform flow of water through the spout 6 when the valve is functioning, and prevents splashing by causing the water to flow through the holes 9 of the baffle bushing 8.

It will be evident that this faucet can be operated by pressing down on the cap with one's arm. It can be operated in this way by persons who do not wish to touch the faucet with their hands.

If the faucet is connected to a combined hot and cold water supply pipe, the chamber 3 will operate as a mixing chamber for the water.

It is understood that the embodiment of the invention described herein is only one of the many embodiments this invention may take, and I do not wish to be limited in the practice of the invention, nor in the claims, to the particular embodiment set forth.

What I claim is:

1. In an automatically closing faucet, the combination of a valve body having a delivery spout, a valve seat within the body, said valve body having a water chamber to receive and accumulate water passing from the valve seat toward the spout, a valve closure co-operating with the seat and having a stem passing upwardly through the body, a pneumatic cylinder open to the atmosphere at its lower end and connected to the upper end of the body, a pneumatic piston moving therein and connected with said stem, a depressible shell surrounding the pneumatic cylinder and connected with the stem for depressing the same to open the valve and move the pneumatic piston toward the open end of the pneumatic cylinder, and operating to admit air in the pneumatic cylinder above the pneumatic piston, said cylinder having a bleeder port to effect the retarded closing of the valve.

2. In an automatically closing faucet, the combination of a valve body having a delivery spout, a valve seat within the body with a water chamber to receive and accumulate water passing from the valve seat toward the spout, a cover for the water chamber, a tubular guide having a threaded connection with the upper end of the valve body to hold the cover in position, a valve closure co-operating with the seat and having a stem passing upwardly through the body and through the tubular guide, a spring exerting its force in a direction to move the valve closure onto its seat, a pneumatic cylinder attached to the said cover and extending upwardly within the tubular guide, a pneumatic piston moving in the pneumatic cylinder and connected with said stem, a depressible shell surrounding the pneumatic cylinder, guided on the tubular guide, and connected with the stem for depressing the same to open the valve and operating to admit air into the pneumatic cylinder and simultaneously compress said spring, said cylinder having a bleeder port to effect the retarded closing of the valve.

3. In an automatic closing faucet, the combination of a valve body having a delivery spout, a valve seat within the body, said body having a water chamber with constantly open ports communicating with the valve-opening through the valve seat, to receive and accumulate water passing from the valve seat toward the spout, a valve closure cooperating with the seat and having a stem passing upwardly through the body, a pneumatic cylinder connected to the upper end of the body, a pneumatic piston moving therein and connected with said stem, a shell surrounding the pneumatic cylinder and connected at its lower end with the stem for depressing the same to move the valve closure to its open position, and operating to admit air into the upper portion of the pneumatic cylinder, said cylinder having a bleeder port in its upper end to effect the retarded closing of the valve.

Signed at Los Angeles, California, this 2d day of August, 1928.

CHARLES F. DENCKLAU.